(12) United States Patent
Torrini et al.

(10) Patent No.: US 11,415,657 B2
(45) Date of Patent: Aug. 16, 2022

(54) ANGLE OF ARRIVAL USING MACHINE LEARNING

(71) Applicant: Silicon Laboratories Inc., Austin, TX (US)

(72) Inventors: Antonio Torrini, Austin, TX (US); Sebastian Ahmed, Austin, TX (US); Joel Kauppo, Espoo (FI); Sauli Johannes Lehtimaki, Nummela (FI)

(73) Assignee: Silicon Laboratories Inc., Austin, TX (US)

( * ) Notice: Subject to any disclaimer, the term of this patent is extended or adjusted under 35 U.S.C. 154(b) by 456 days.

(21) Appl. No.: 16/587,221

(22) Filed: Sep. 30, 2019

(65) Prior Publication Data
US 2021/0096207 A1 Apr. 1, 2021

(51) Int. Cl.
*G01S 3/04* (2006.01)
*G06N 3/08* (2006.01)
*G01S 3/28* (2006.01)
*G01S 3/48* (2006.01)

(52) U.S. Cl.
CPC ............. *G01S 3/043* (2013.01); *G06N 3/08* (2013.01); *G01S 3/28* (2013.01); *G01S 3/48* (2013.01)

(58) Field of Classification Search
CPC ............. G01S 3/43; G01S 3/28; G01S 3/48
USPC ............. 342/445, 417, 452, 357.44
See application file for complete search history.

(56) References Cited

U.S. PATENT DOCUMENTS

| 2019/0336107 A1* | 11/2019 | Hope Simpson ..... G06T 7/0012 |
| 2020/0160985 A1* | 5/2020 | Kusuma ................. G16H 30/40 |
| 2020/0345325 A1* | 11/2020 | Tahmasebi Maraghoosh ............ A61B 8/5246 |
| 2021/0399775 A1* | 12/2021 | Lehtimaki ............ H04B 7/0602 |

OTHER PUBLICATIONS

Khan et al., "Angle-of-Arrival Estimation Using an Adaptive Machine Learning Framework", IEEE Communications Letters, vol. 23, No. 2, pp. 294-297, Feb. 2019.

* cited by examiner

*Primary Examiner* — Bo Fan
(74) *Attorney, Agent, or Firm* — Nields, Lemack & Frame, LLC

(57) ABSTRACT

A system and method of determining the angle of arrival or departure using a neural network is disclosed. The system collects a plurality of I and Q samples as a packet containing a constant tone extension is being received. The I and Q samples are used to form I and Q arrays, which are used as the input to the neural network. The neural network produces a first output representative of the azimuth angle and a second output representative of the elevation angle. In certain embodiments, the neural network is capable of detecting a plurality of angles, where, for each angle, there are three outputs, a first output representative of the azimuth angle, a second output representative of the elevation angle and a third output representative of the relative amplitude. In some embodiments, the neural network is configured to determine the carrier frequency offset of an incoming signal as well.

20 Claims, 11 Drawing Sheets

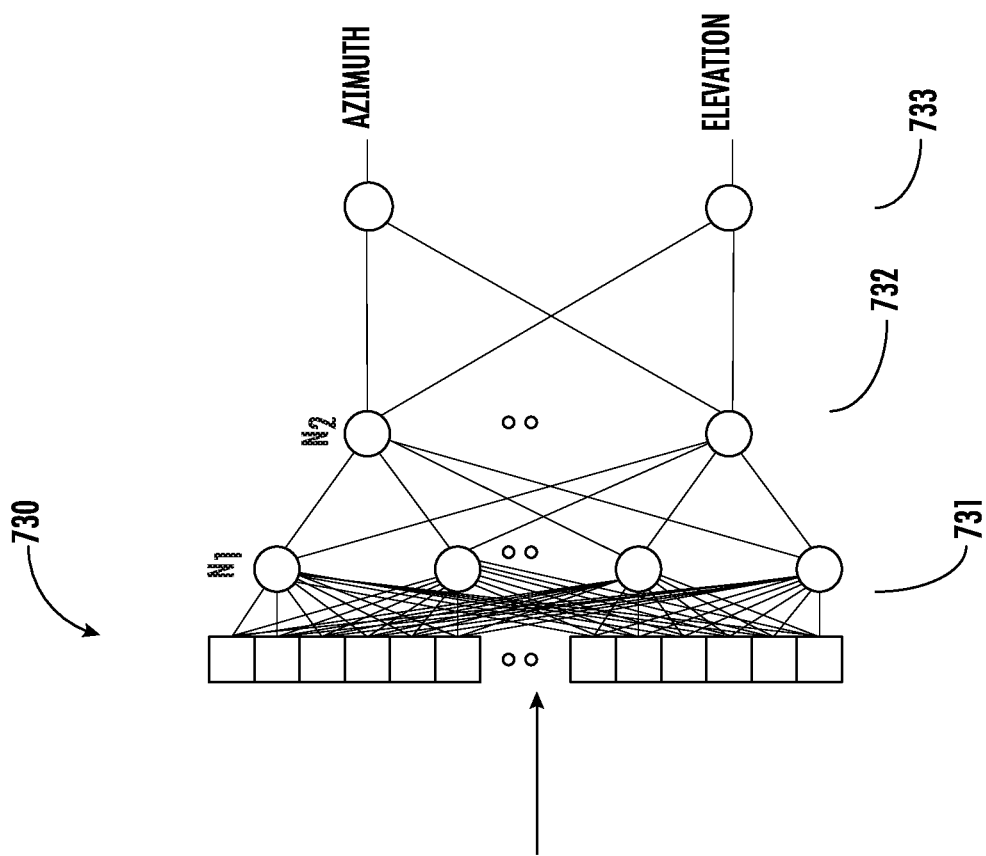
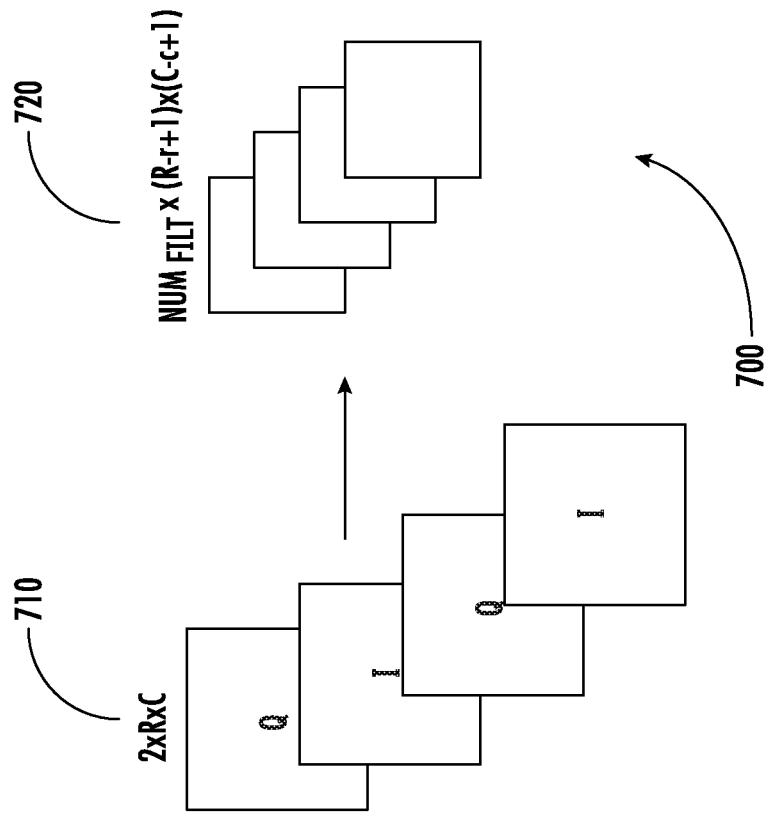
FIG. 7A

ANGLE OF ARRIVAL USING MACHINE LEARNING

This disclosure describes systems and methods for calculating Angle of Arrival and Angle of Departure using Machine Learning.

BACKGROUND

Angle of Arrival and Angle of Departure algorithms, collectively referred to as AoX algorithms, typically operate by determining a phase difference between different antenna elements in an antenna array. This phase difference can be used to determine the angle from which the signal originated, since the distance between antenna elements is known.

Specifically, assume the distance between two adjacent antenna elements is d. The phase difference between when the incoming signal is detected at these two adjacent antennas can be given as $\varphi$. This phase difference, $\varphi$, divided by $2\pi$, multiplied by the wavelength, $\lambda$, represents the distance between the two antenna elements, as viewed from the signal source. Knowing this difference in the distance that the incoming signal travelled allows the angle of arrival to be calculated. Specifically, the angle of arrival can be given by the difference in the distance that the incoming signal travelled, divided by d represents the cosine of the incoming signal. In other words, the angle of arrival is defined as the arc cosine of $(\varphi\lambda/2\pi)/d$.

One algorithm that is commonly used to determine AoX is referred to as MUSIC. This algorithm generates pseudospectrums from the incoming data and estimates the most likely AoX from these pseudospectrums. While this algorithm is known to be accurate, it is very compute intensive. For example, an AoX determination using MUSIC may require in excess of 10 million arithmetic operations (i.e. multiplications and additions). In addition, this algorithm is highly dependent on having a very accurate representation of the antenna array.

Therefore, it would be beneficial if there were a method of determining an AoX that was not as compute intensive. It would be advantageous if this method also worked well with non-ideal antenna arrays and other sources of impairment.

SUMMARY

A system and method of determining the angle of arrival or departure using a neural network is disclosed. The system collects a plurality of I and Q samples as a packet containing a constant tone extension is being received. The I and Q samples are used to form I and Q arrays, which are used as the input to the neural network. The neural network produces a first output representative of the azimuth angle and a second output representative of the elevation angle. In certain embodiments, the neural network is capable of detecting a plurality of angles, where, for each angle, there are three outputs, a first output representative of the azimuth angle, a second output representative of the elevation angle and a third output representative of the relative amplitude. In some embodiments, the neural network is configured to determine the carrier frequency offset of an incoming signal as well.

According to one embodiment, a wireless network device to calculate an angle of arrival or an angle of departure is disclosed. The wireless network device comprises an antenna array comprising a plurality of antenna elements; a wireless network interface, wherein the wireless network interface receives an incoming signal using the antenna array and generates an I signal and a Q signal; a processing unit; a memory device, comprising instructions, which when executed by the processing unit, enable the wireless network device to: receive a packet that includes a constant tone extension (CTE), wherein the CTE comprises a tone having a known frequency and wherein the CTE comprises a guard period, a reference period, a plurality of switch slots and a plurality of sample slots; sample the CTE during each of the plurality of sample slots, wherein each antenna element samples at least one sample slot; store a plurality of I and Q signals, where one I signal and one Q signal is stored during each sample slot; create an I and Q array, wherein dimensions of the I and Q arrays are equal to dimensions of the antenna array, such that a value of an element in the I array is representative of the I signals obtained by a respective antenna element and a value of an element in the Q array is representative of the Q signals obtained by the respective antenna element; and use the I and Q arrays as inputs to a neural network, wherein the neural network produces outputs indicative of the angle of arrival of the incoming packet. In certain embodiments, the outputs comprise an azimuth angle and an elevation angle. In certain embodiments, the outputs comprise a first complex number where an arc tangent of the first complex number is an azimuth angle and a second complex number where an arc tangent of the second complex number is an elevation angle. In certain embodiments, the neural network comprises a convolutional neural network. In some further embodiments, the convolutional neural network comprises a convolutional stage and a fully connected stage, wherein the convolutional stage comprises one or more convolutional layers and the fully connected stage comprises one or more fully connected layers. In certain embodiments, each antenna element samples at least two sample slots and the value of an element in the I array is an average of the I signals obtained by a respective antenna element and a value of an element in the Q array is an average of the Q signals obtained by the respective antenna element.

According to another embodiment, a wireless network device to calculate an angle of arrival or an angle of departure is disclosed. The wireless network device comprises an antenna array comprising a plurality of antenna elements; a wireless network interface, wherein the wireless network interface receives an incoming signal using the antenna array and generates an I signal and a Q signal; a processing unit; a memory device, comprising instructions, which when executed by the processing unit, enable the wireless network device to: receive a packet that includes a constant tone extension (CTE), wherein the CTE comprises a tone having a known frequency and wherein the CTE comprises a guard period, a reference period, a plurality of switch slots and a plurality of sample slots; sample the CTE during each of the plurality of sample slots, wherein each antenna element samples at least one sample slot; store a plurality of I and Q signals, where one I signal and one Q signal is stored during each sample slot; create an I and Q array, wherein dimensions of the I and Q arrays are equal to dimensions of the antenna array, such that a value of an element in the I array is representative of the I signals obtained by a respective antenna element and a value of an element in the Q array is representative of the Q signals obtained by the respective antenna element; and use the I and Q arrays as inputs to a neural network, wherein the neural network determines a plurality of angles of arrival and wherein for each angle of arrival, the neural network produces a first output representative of an azimuth angle, a second output representative of an elevation angle and a third output representative of an amplitude. In certain embodiments, the third output associated with the strongest signal is set to one and the other third outputs are normalized to this output. In certain embodiments, the first output comprises the azimuth angle and the second output comprises the elevation angle. In certain embodiments, the first output comprises a first complex number where an arc tangent of the first complex number is the azimuth angle and the second output comprises a second complex number where an arc tangent of the second complex number is the elevation angle. In certain embodiments, the neural network comprises a convolutional neural network. In certain embodiments, the convolutional neural network comprises a convolutional stage and a fully connected stage, wherein the convolutional stage comprises one or more convolutional layers and the fully connected stage comprises one or more fully connected layers. In some embodiments, each antenna element samples at least two sample slots and the value of an element in the I array is an average of the I signals obtained by a respective antenna element and a value of an element in the Q array is an average of the Q signals obtained by the respective antenna element.

According to another embodiment, a wireless network device to calculate an angle of arrival or an angle of departure is disclosed. The wireless network device comprises an antenna array comprising a plurality of antenna elements; a wireless network interface, wherein the wireless network interface receives an incoming signal using the antenna array and generates an I signal and a Q signal; a processing unit; a memory device, comprising instructions, which when executed by the processing unit, enable the wireless network device to: receive a packet that includes a constant tone extension (CTE), wherein the CTE comprises a tone having a known frequency and wherein the CTE comprises a guard period, a reference period, a plurality of switch slots and a plurality of sample slots; sample the CTE during each of the plurality of sample slots, wherein each antenna element samples at least N sample slots; store a plurality of I and Q signals, where one I signal and one Q signal is stored during each sample slot; create N different I and Q arrays, wherein dimensions of each I and Q arrays are equal to dimensions of the antenna array, such that a value of an element in the I array is the I signal obtained by a respective antenna element during one sample slot and a value of an element in the Q array is the Q signal obtained by the respective antenna element during the one sample slot; and use the N different I and Q arrays as inputs to a neural network, wherein the neural network produces outputs indicative of the angle of arrival of the incoming packet. In certain embodiments, the use of N different I and Q arrays compensates for carrier frequency offset. In certain embodiments, the processing unit samples the CTE during at least a portion of the guard period and the reference period and creates initial I and Q values based on samples from the guard period and the reference period, and wherein the initial I and Q values are inputs to the neural network. In certain embodiments, the neural network comprises a convolution stage and a fully connected stage, and wherein the initial I and Q values are inputs to the fully connected stage. In other embodiments, the neural network comprises a convolution stage, a fully connected stage, and a separate stage, wherein the initial I and Q values are inputs to the separate stage which provides an indication of carrier frequency offset to the fully connected stage. In certain embodiments, the neural network produces an output indicative carrier frequency offset. In certain embodiments, the neural network comprises a convolutional neural network.

BRIEF DESCRIPTION OF THE DRAWINGS

For a better understanding of the present disclosure, reference is made to the accompanying drawings, in which like elements are referenced with like numerals, and in which:

FIG. 7A-7D are block diagrams of different configurations of the neural network according to other embodiments.

DETAILED DESCRIPTION

Figure 1:
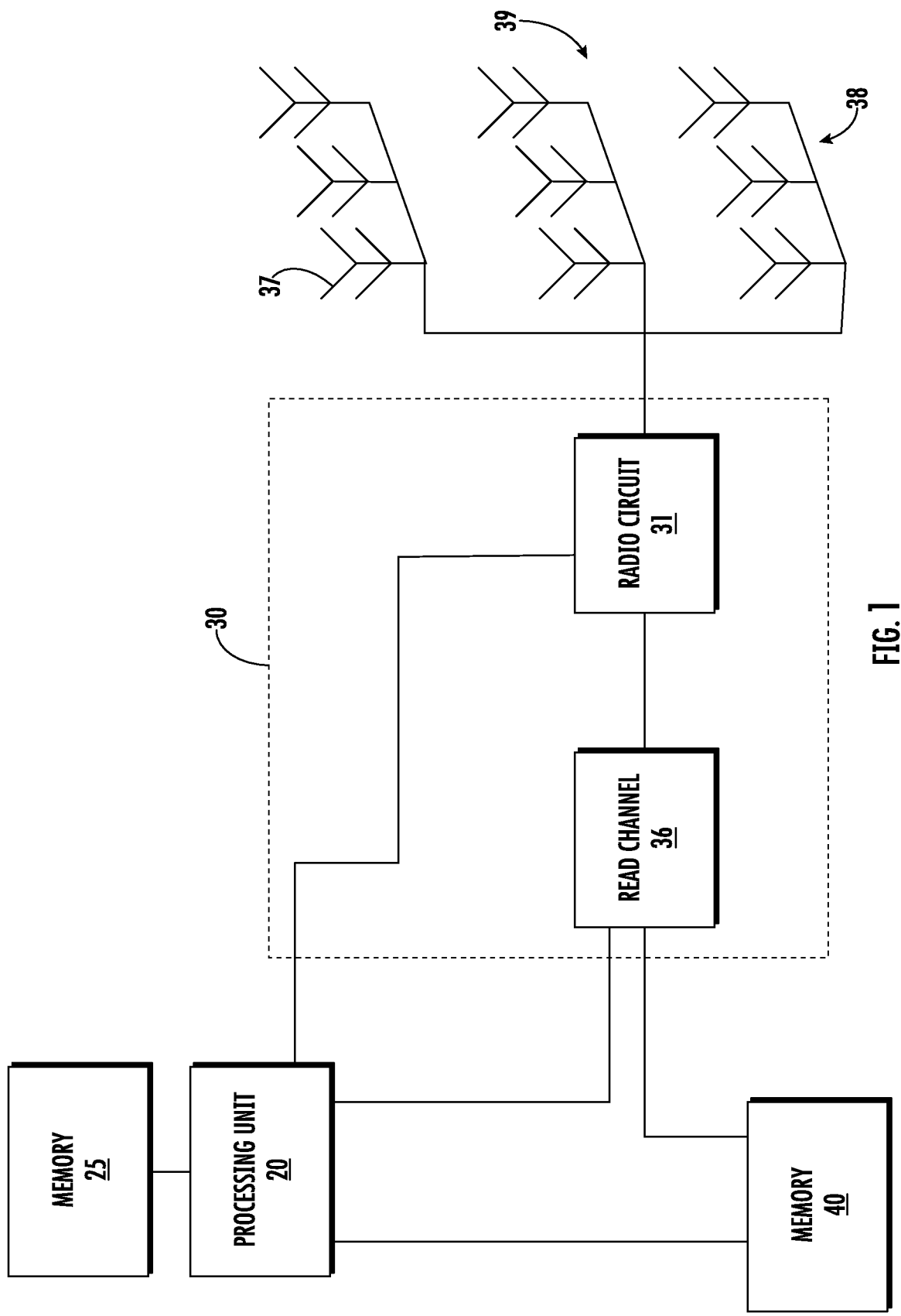
FIG. 1 is a block diagram of a network device that may be used to perform the method described herein.

FIG. 1 shows a network device that may be used to perform the AoX algorithm described herein. The network device 10 has a processing unit 20 and an associated memory device 25. The processing unit 20 may be any suitable component, such as a microprocessor, embedded processor, an application specific circuit, a programmable circuit, a microcontroller, or another similar device. In certain embodiments, the processing unit 20 may be a neural processor. In other embodiments, the processing unit 20 may include both a traditional processor and a neural processor. The memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media. In certain embodiments, the software environment may utilize standard libraries, such as Tensorflow and Keras.

The network device 10 also includes a network interface 30, which may be a wireless network interface that includes an antenna array 38. The network interface 30 may support any wireless network protocol that supports AoX determination, such as Bluetooth. The network interface 30 is used to allow the network device 10 to communicate with other devices disposed on the network 39.

The network interface 30 include radio circuit 31. This radio circuit 31 is used to process the incoming signal and convert the wireless signals to digital signals. The components within the radio circuit 31 are described in more detail below.

The network interface 30 also includes a read channel 36. The read channel 36 is used to receive, synchronize and decode the digital signals received from the radio circuit 31. Specifically, the read channel 36 has a preamble detector that is used to identify the start of an incoming packet. The read channel 36 also has a sync detector, which is used to identify a particular sequence of bits that are referred to as a sync character. Additionally, the read channel 36 has a decoder which is used to convert the digital signals into properly aligned bytes of data.

The network device 10 may include a second memory device 40. Data that is received from the network interface 30 or is to be sent via the network interface 30 may also be stored in the second memory device 40. This second memory device 40 is traditionally a volatile memory.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

While the processing unit 20, the memory device 25, the network interface 30 and the second memory device 40 are shown in FIG. 1 as separate components, it is understood that some or all of these components may be integrated into a single electronic component. Rather, FIG. 1 is used to illustrate the functionality of the network device 10, not its physical configuration.

Although not shown, the network device 10 also has a power supply, which may be a battery or a connection to a permanent power source, such as a wall outlet.

Figure 2:
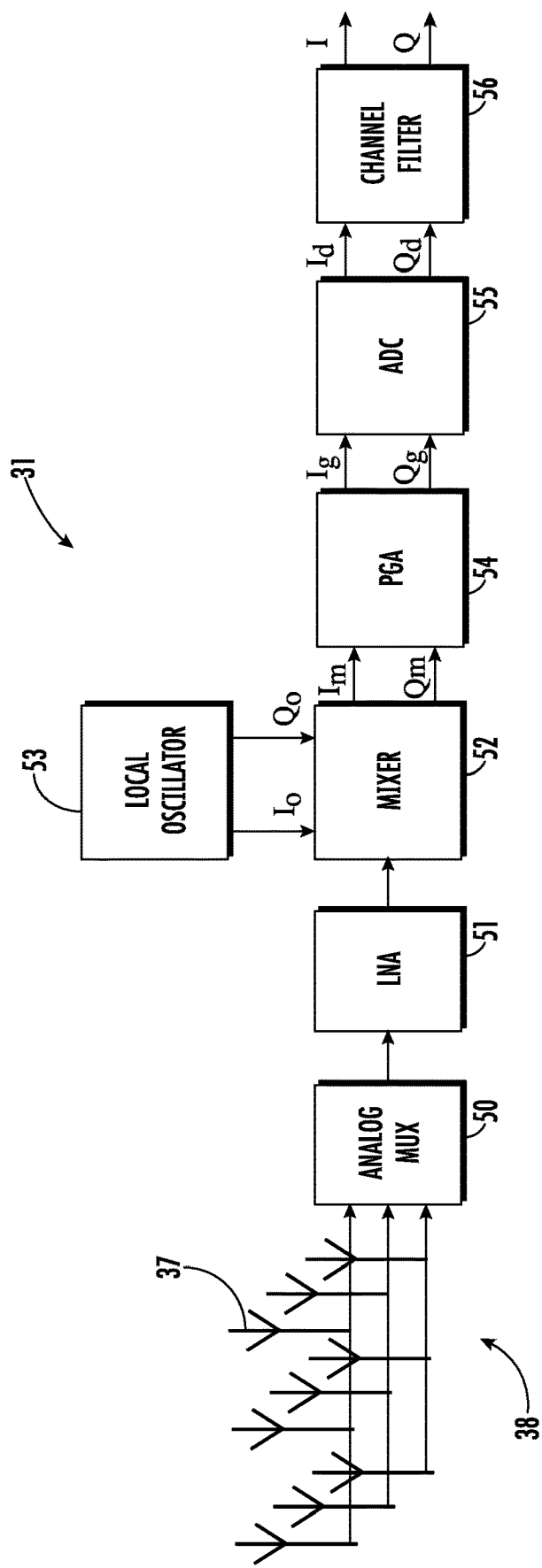
FIG. 2 is a block diagram of the radio receiver of the network device of FIG. 1.

FIG. 2 shows a block diagram of the radio circuit 31. The wireless signals first enter the radio circuit 31 through one antenna element 37 of the antenna array 38. An analog multiplexer 50 may be used to select one antenna element 37 from the antenna array 38. Once selected, this antenna element 37 is in electrical communication with a low noise amplifier (LNA) 51. The LNA 51 receives a very weak signal from the antenna element 37 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52 are then fed into programmable gain amplifier (PGA) 54. The PGA 54 amplifies the $I_m$ and $Q_m$ signals by a programmable amount. These amplified signals are referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may pass through channel filter 56 then exit the radio circuit 31 as I and Q. In certain embodiments, the I and Q values maybe considered complex numbers, wherein the I value is the real component and the Q value is the imaginary component.

The I and Q signals then enter a CORDIC (Coordination Rotation Digital Computer), which determines the amplitude and phase of the signals. Amplitude is given as the square root of $I^2$ and $Q^2$, while phase is given by the $\tan^{-1}$ (Q/I). The CORDIC may be disposed in the radio circuit 31, or elsewhere within the network interface 30.

Figure 3A:
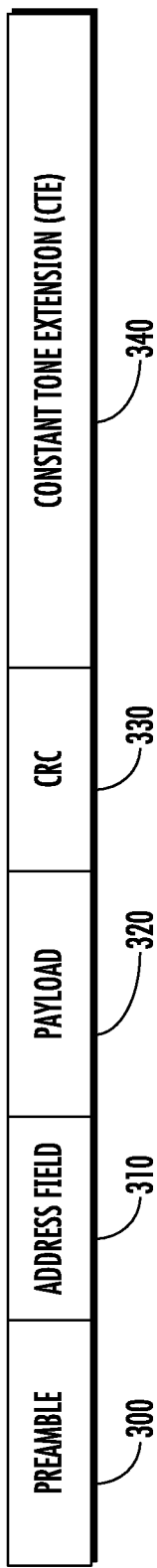
FIG. 3A-3C shows the format of a representative direction detection message transmitted to the system of FIG. 1.
Figure 3B:
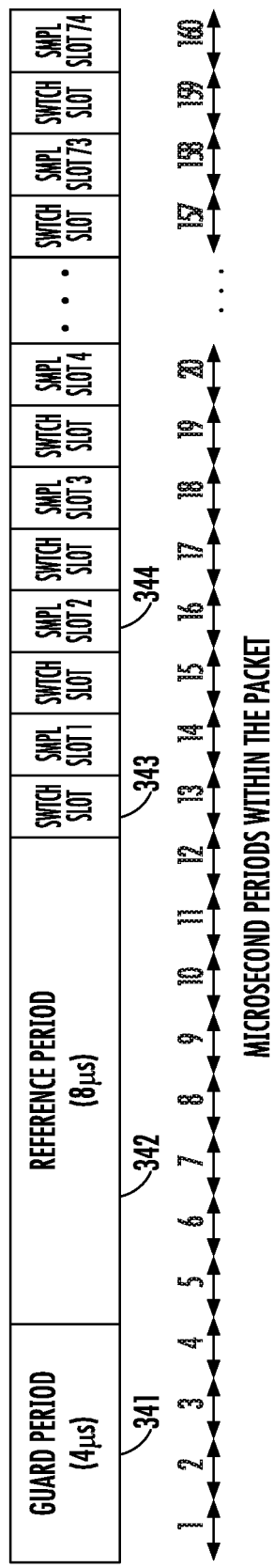
Figure 3C:
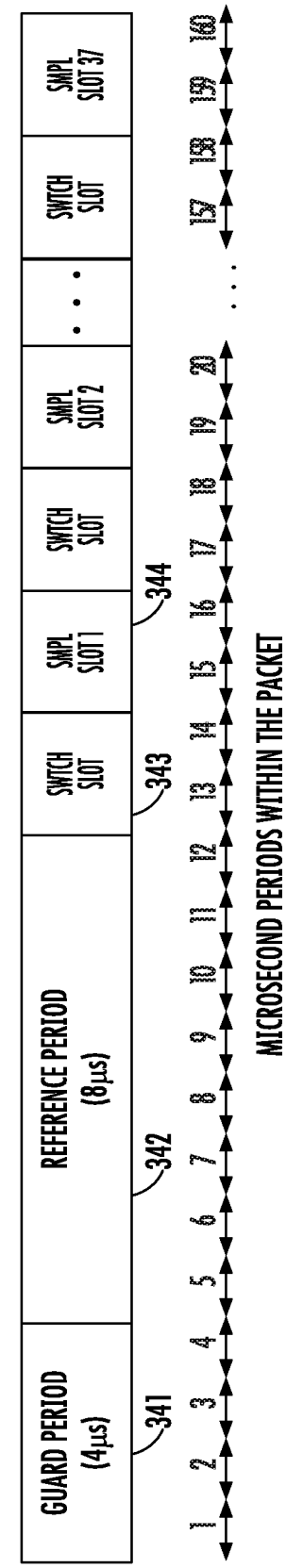

In certain embodiments, the network interface 30 operates on a wireless network that utilizes the Bluetooth network protocol. FIG. 3A shows the format of a special Bluetooth packet that is used for direction detection. These packets typically begin with a preamble 300, an address field 310, a payload 320 and a checksum or CRC 330. However, the special packets also include a constant tone extension (CTE) 340. FIGS. 3B and 3C show two different formats for the CTE 340. In both formats, the CTE 340 includes a guard period 341, a reference period 342, and a plurality of switch slots 343 and sample slots 344. The duration of each switch slot 343 and sample slot 344 may be 1 µsec or 2 µsec, as shown in FIGS. 3B and 3C, respectively. The CTE 340 is a special extension to the Bluetooth packet that transmits a constant frequency, such as a 250 kHz tone. For example, the CTE 340 may be a string of consecutive "1"'s. The CTE 340 may be as long as 160 µsec and as short as 16 µsec. In practice, the network device 10 uses a single antenna element 37 of the antenna array 38 to receive the CTE 340 during the guard period 341 and the reference period 342. The network device 10 then switches to another antenna element 37 during each switch slot 343 by changing the selection of the analog multiplexer 50 in the radio circuit 31. The network device 10 samples the tone again with that new antenna element 37 during the sample slot 344. The network device 10 continues switching the antenna element 37 during each switch slot 343 and sampling the tone during the sample slot 344. If there are more switch slots 343 than antenna elements, the network device 10 returns to the first antenna element 37 and repeats the sequence.

During the entirety of the CTE 340, the sending device is transmitting a tone at a constant known frequency. As stated above, the network device 10 may receive that tone using one antenna element 37 of the antenna array. Specifically, the guard period 341 and the reference period 342, which have a combined duration of 12 µsec, are received using the same antenna element 37.

Figure 6:
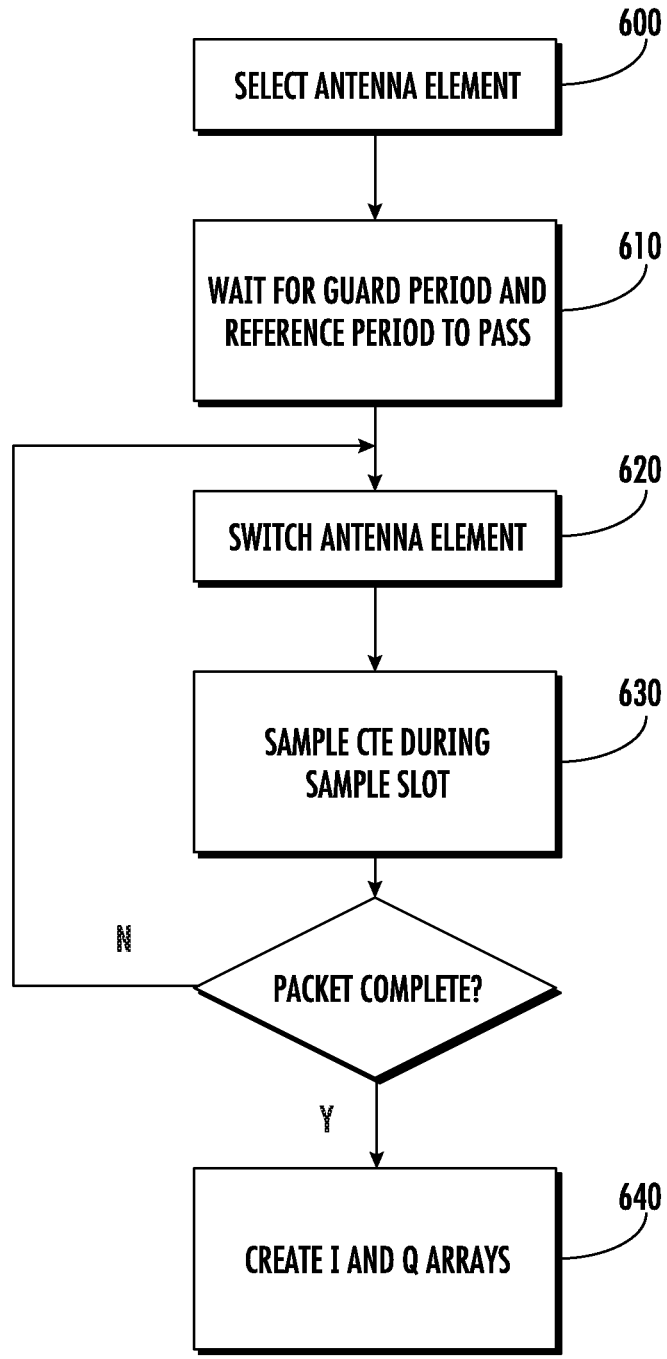
FIG. 6 is a flow chart showing the collection of I and Q samples according to one embodiment.

The network device 10 then performs the steps described above to generate the I and Q signals. A flowchart showing this operation is shown in FIG. 6.

When the CTE begins, the processing unit 20 selects an antenna element 37, as shown in Process 600. The processing unit 20 then receives the CTE 340 and waits for the guard period 341 and the reference period 342 to pass, as shown in Process 610. At this point, the device 10 will switch its antenna element 37 every switch slot 343 and sample the tone every sample slot 344, as shown in Processes 620 and 630. If the packet is not complete, the processing unit 20 will repeat these two processes until the packet is complete. After the packet has been received, the processing unit 20 may assemble the sampled I and Q values into the I and Q arrays, as shown in Process 640. In certain embodiments, all of the I and Q values associated with a particular antenna are averaged to create that entry in the I and Q arrays, respectively.

As noted above, in certain embodiments, the antenna array 38 has fewer antenna elements 37 than there are sample slots 344. In this embodiment, there will be two or more I and Q samples that are obtained using the same antenna element 37. For example, if the incoming packet has a CTE 340 as shown in FIG. 3B, there will be 74 I and Q samples. If the antenna array 38 is arranged as a 4×4 array of antenna elements 37, then each antenna element 37 will have sampled the incoming tone at least 4 times. Of course, if the antenna array 38 is a different configuration, these values may change.

As an illustration, assume that the antenna array 38 is configured as an array having a number of rows (R) and a number of columns (C) of R×C antenna elements 37. The number of samples from each antenna element may be roughly the number of sample slots 344 divided by the product of R×C.

In certain embodiments, an I array is created, where the I array is of the same dimension as the antenna array 38. Thus, in this example, the I array will be represented as an array of dimension (R,C). Similarly, a Q array is also created and represented as an array of dimension (R,C). Note that the value of the I array at a particular position corresponds to the value of I that was obtained by the antenna element 37 in that position in the antenna array 38. This is also true of the Q array. In certain embodiments, the value in the I and Q arrays at a particular position may be equal to the average values of I and Q, respectively, obtained by that antenna array through the entire CTE 340. In other words, if the antenna element in the first row and first column received 5 samples during the CTE 340, the value of I(1,1) will be the average of the five I values obtained by that antenna element and the value of Q(1,1) will be the average of the five Q values obtained by that antenna element. In other embodiments, the values in the I and Q arrays may be determined based on a weighted average or some other function of the samples received by that antenna element 37. In yet other embodiments, multiple I and Q arrays are created, where each I and Q array includes one sample from each antenna element 37.

Figure 4:
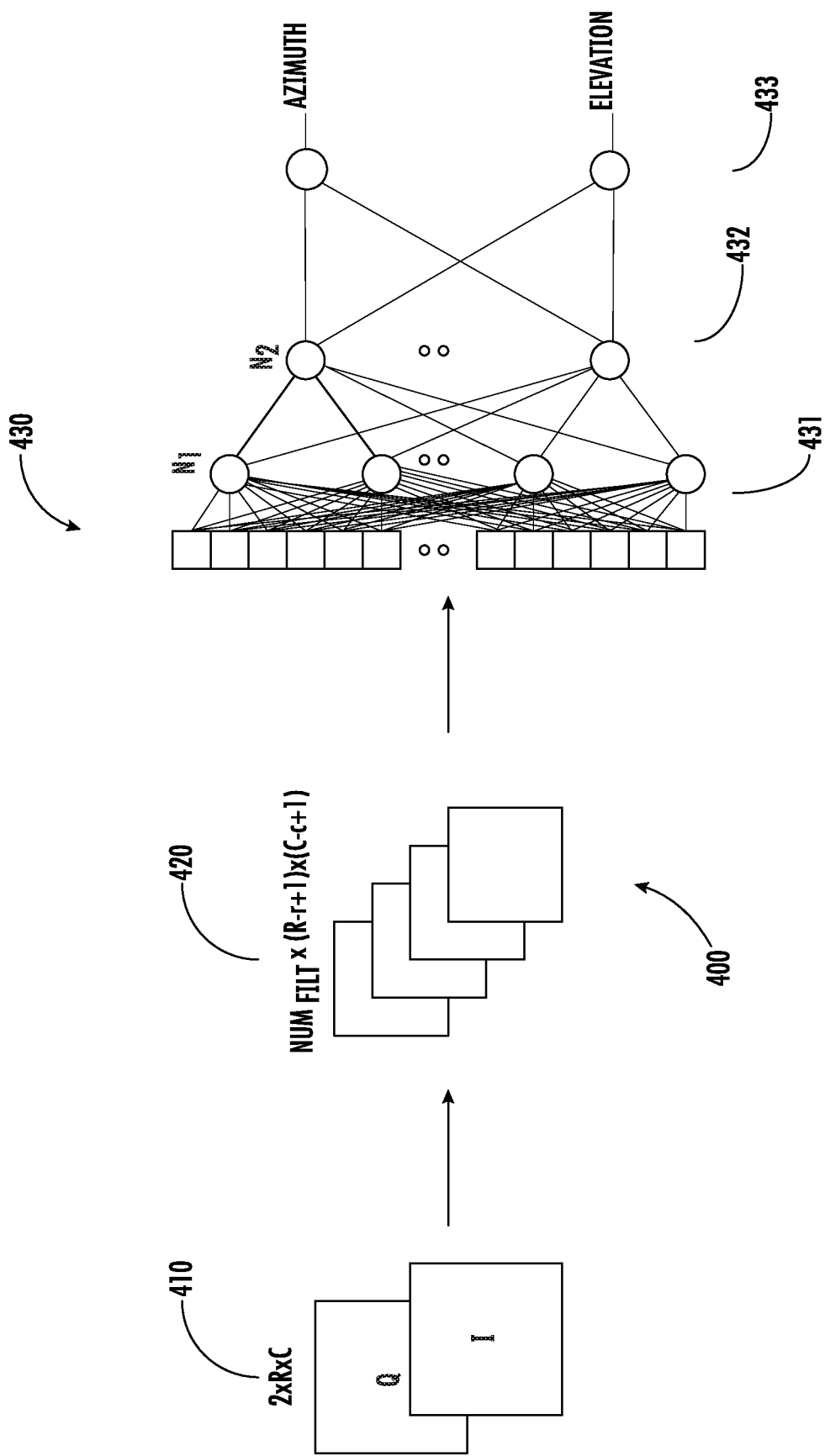
FIG. 4 is a block diagram of the neural network according to one embodiment.

These I and Q arrays are used as inputs to a neural network, and more specifically, to a convolutional neural network (CNN). FIG. 4 shows the structure of this CNN 400 according to one embodiment.

The input stage 410 comprises the I and Q arrays described above. In other words, the input to the CNN 400 is a representation of the I and Q values that were received by each antenna element 37 in the antenna array 38.

While FIG. 4 shows the I and Q arrays as being two-dimensional, the disclosure is not limited to this embodiment. For example, the antenna may be a linear array of 8 antenna elements. In this case, the I and Q arrays would be dimensioned as (8,1).

These I and Q arrays are used as the input to a convolution stage 420. The convolution layer convolves the I array and the Q array using a plurality of different filters. This plurality may be referred to as $Num_{filter}$. In certain embodiments, 64 filters are used the I array and for the Q array. Note that these filters need not be the same for the I and Q arrays.

The dimension of the filter may be determined based on the dimension of the I and Q arrays. For example, if the I and Q arrays are each 4×4, the filters may be, for example, 2×2, or 3×3. Note that the filters need not be square. For example, if the I and Q arrays are linear arrays, the filters would also be linear arrays. The convolution of the I and Q arrays with each filter creates a new set of arrays, the dimension of which is determined based on the dimension of the filter and the I and Q arrays. In certain embodiments, the I and Q arrays are padded such that the new arrays have a dimension equal to the original I and Q arrays.

In operation, the filter is used to operate on a portion of the I array having the same dimension as the filter. Typically, the operation is a dot product. The result of that operation is stored in the convolution array. For example, if the I and Q arrays are each dimensioned as R×C, and the filter is 2×2, the filter is first used to operate on I(1,1), I(1,2), I(2,1) and I(2,2). The result is stored in the convolution array at position (1,1). The filter is then moved to the right so as to operate on I(1,2), I(1,3), I(2,2) and I(2,3). This continues until the last element in the row of the I array is reached. The process then repeats by stepping down one row and repeating the process. In this case, resulting convolution array will be (R−1)×(C−1). Similarly, if the filter is 3×3, the resulting convolution array will be (R−2)×(C−2). Thus, if the dimension of the filter is r×c, the resulting convolution array will be of dimension (R−r+1, C−c+1). This is performed for each of the filter, resulting in $Num_{filt}$ convolution arrays. This same process is used for the Q array and the filters associated with that array. Again, this results in $Num_{filt}$ convolution arrays. In certain embodiments, each of the convolution arrays derived from the I array is added with a corresponding convolution array derived from the Q array. This may be simple matrix addition. Thus, the result of a first convolution layer is a set of $Num_{filt}$ convolution arrays.

In certain embodiments, a regularization function is performed on all of the convolution arrays. In most embodiments, the regularization function simply replaces each element of each convolution array with 0 if the element was negative or leaves the element unchanged is it was positive. This may be referred to as a rectified linear unit or ReLU. In this way, the convolution arrays contain no negative values.

Thus, after this convolution layer, there are a total of $Num_{filt}$×(R−r+1)×(C−c+1) separate values that have been generated. In other words, there are $Num_{filt}$ convolution arrays, each having a dimension of (R−r+1, C−c+1). Each of these elements can then be used as inputs to a fully connected stage 430. The fully connected stage 430 connects each of the inputs to each of $N_1$ neurons. Further, each connection between an element of the input and a neuron has an associated weight. Thus, there is $N_1$×$Num_{filt}$×(R−r+1)×(C−c+1) connections and associated weights.

In certain embodiments, the value of $N_1$ may be a power of 2, such as 32, 64 or 128. Further, in certain embodiments, there may be multiple fully connected layers. For example, in FIG. 4, the first fully connected layer 431 has $N_1$ neurons. These $N_1$ neurons may be used as the inputs for the second fully connected layer 432, which has $N_2$ neurons, wherein $N_2$<$N_1$. As described above, there will be $N_2$×$N_1$ connections, where each connection has an associated weight.

In certain embodiments, the result from the final fully connected layer 433 of the fully connected stage 430 will be outputs that represent the calculated elevation and azimuth angles. In one embodiment, the final layer of the fully connected stage 430 has two outputs, where one is the elevation angle and the second is the azimuth angle.

In another embodiment, the final layer of the fully connected stage 430 has four outputs, a first complex number (i.e. a real component and an imaginary component) that represents the elevation angle and a second complex number that represents the azimuth angle. In other words, each complex number comprises two numbers, a and b, which are to be interpreted as a+bi. By calculating the arc tangent of each of these two complex numbers, the azimuth angle and the elevation angle may be determined. For example, assume the outputs from the final layer were 1, 1.73 and 1, 1. This implies that the azimuth angle is represented by 1+1.73i and the elevation angle is represented as 1+1i. The arc tangent of these complex numbers yields an azimuth angle of 60° and an elevation angle of 45°. This output may be used to avoid issues associated with angle wrap.

Thus, the CNN 400 provides two outputs associated with the calculated angle; one output that is representative of the azimuth angle and a second output that is representative of the elevation angle.

Note that these outputs are much different than the outputs from traditional CNNs. Specifically, traditional CNNs are typically used to distinguish between a number of different images. These images may be text, numbers, photos, or other images. The outputs from traditional CNNs comprise likelihoods or probabilities that the input image is one of a predefined set of images. As a simplistic example, a CNN would generate 26 outputs, representing the probability that the input image was a particular letter of the alphabet. In other words, CNNs typically include a classification function.

In contrast, as stated above, the present system actually outputs values that is representative of the angle of arrival or departure.

Thus, the present system and method uses the I and Q arrays, as obtained by an antenna array as an input to a neural network, and provides outputs that is representative of the angle of arrival or angle of departure. In certain embodiments, as described above, the neural network is a convolutional neural network.

While FIG. 4 shows the basic structure of the CNN 400, it is noted that modifications may be made to this structure. For example, while FIG. 4 shows a single convolution layer, multiple convolution layers may be used in the convolution stage 420. Each convolution layer may be followed by a regularization function, and optionally a pooling function and/or a batch normalization function. Similarly, the number of fully connected layers in the fully connected stage 430 is not limited to that shown in FIG. 4. Rather, more or fewer fully connected layers may be used.

Having defined the structure of the CNN 400, the CNN can then be trained. As is well known, machine learning systems may be trained using backpropagation algorithms. In these algorithms, data is input to the CNN and the output from the CNN is compared to the expected result. This difference or error, is then used to adjust the weights in the fully connected stage 430. The training is done by performing multiple iterations with each possible (azimuth, elevation) pair. To make the CNN more robust, white noise may be introduced into the training data. Further, antenna element gain mismatch may also be included in the training data. Additionally, arbitrary fixed phase rotations may also be included in the training data. Experiments have shown that the error drops to less than 0.1% RMS in less than 6000 iterations.

For example, in one embodiment, the training data may fall into different categories. The first category is ideal model data. The second category is simulated data that models imperfect antenna arrays, noise, and other impairments. A third category may be actual lab data generated in an anechoic chamber. The fourth category is in situ data, which includes multipath and other impairments. In certain embodiments, the CNN is trained using all four categories of data. In other embodiments, one or more of the first three categories of data are used to trained the CNN. The results are then refined by supplying more data from the in situ environment. In other embodiments, the CNN is trained using less than all four categories of data.

One of the advantages of the present system and method is its ability to operate correctly, even when the antenna array 38 is not ideal. Specifically, many algorithms assume that the antenna array performs ideally, based on its configuration. Any variation in this performance will introduce errors into other algorithms, such as MUSIC. In contrast, the present system can be trained using an antenna array having non-ideal performance. Thus, this information is incorporated into the training data, allowing the present system and method to correct for any non-ideal performance. For example, in one test, the present system resolves the elevation angle with less than 1.6° of error and the azimuth angle with less than 1° of error. In contrast, the MUSIC algorithm resolves the elevation angle with an error of almost 4° and resolves the azimuth angle with an error of about 1.5°.

In addition to the detection of the angle of arrival or departure, the present system and method can be modified to consider non-line-of-sight environments. In these environments, the incoming signal may be reflected off one or more surfaces toward the antenna array 38. This results in the algorithm detecting a plurality of different angles of arrival.

Figure 5:
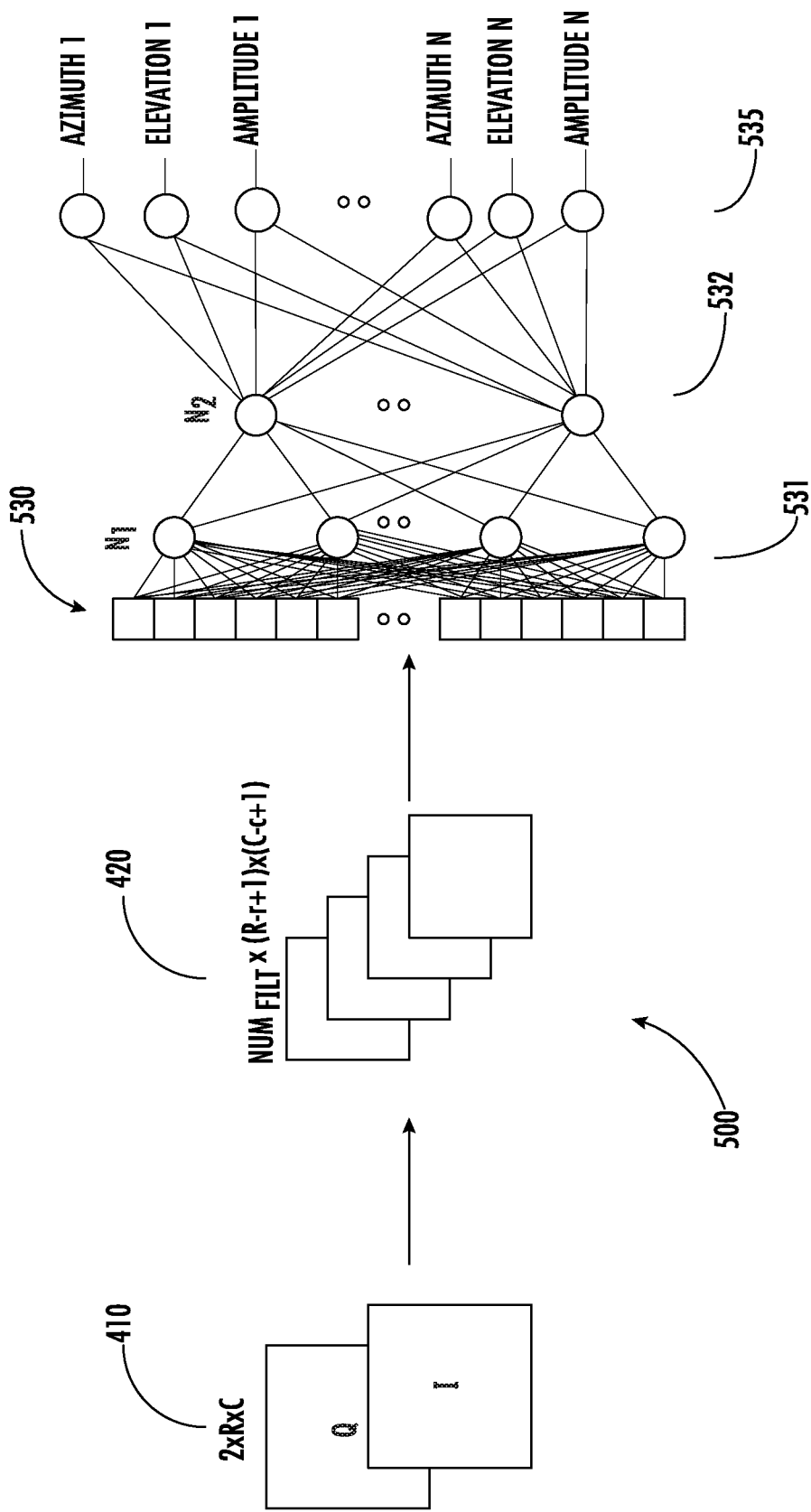
FIG. 5 is a block diagram of the neural network according to another embodiment.

FIG. 5 shows a modification to the CNN structure of FIG. 4 that allows for the detection of multiple angles. Most of the structure is identical to that shown in FIG. 4, have been given the same reference designators and will not be described again. In this embodiment, the fully connected stage 530 may include multiple fully connected layers. For example, in FIG. 5, the first fully connected layer 531 has $N_1$ neurons. These $N_1$ neurons may be used as the inputs for the second fully connected layer 532, which has $N_2$ neurons, wherein $N_2 < N_1$. As described above, there will be $N_2 \times N_1$ connections, where each connection has an associated weight. The fully connected stage 530 also includes a final stage 535. There may be more or fewer fully connected layers in the fully connected stage 530.

In this embodiment, the final stage 535 of the fully connected stage 530 is modified to allow for multiple detections. As shown in the CNN 500 of FIG. 5, the final stage 535 allows for the detection of "n" different angles, where "n" is a user selected parameter. For each of these "n" angles, the CNN 500 generates three types of outputs. The first type of output is a representation of the azimuth angle of the first angle. As explained above, this value may either be the actual angle of arrival, or may be two values that represent the complex number associated with the angle of arrival. The second type of output is a representation of the elevation angle of the first angle. As noted above, this value may either be the actual angle of arrival, or may be two values that represent the complex number associated with the angle of arrival. The third type of output is the relative strength of the signal associate with this angle. In certain embodiments, the strongest signal is set to an output of 1 and all other amplitudes are normalized with respect to this strongest signal. In other embodiments, the values of the different amplitude signals are relative to one another, but are not normalized.

Thus, the CNN 500 provides multiple outputs associated with each calculated angle; one output that is representative of the azimuth angle, a second output that is representative of the elevation angle and a third output that is representative of the relative amplitude. In a pure line-of-sight environment having a single sending node, the third output for all angles, except one, would be expected to be zero.

Like the CNN structure 400 of FIG. 5, this CNN structure 500 can be trained by performing multiple iterations with varying angles of arrival in a non-line-of-sight environment. It is noted that if the CNN structure 500 is allowed to be trained in situ, its results are very accurate, as it is capable of learning the reflections and other attributes of its environment. As an example, the initial training may be done normally, as described above, followed by in situ refinement training. For example, in one test, where the CNN structure was able to learn its environment, it detected angles with an error of less than 5°. In contrast, the MUSIC algorithm used in the same environment has errors as large as 20° in the azimuth direction!

Thus, in this embodiment, the system and method provides for the detection of a plurality of angles, where each angle is represented by an elevation angle, an azimuth angle and an relative amplitude. Again, as was explained with respect to FIG. 4, the input to the CNN 500 is the I and Q arrays collected by the antenna array 38.

Additionally, the present architecture may also be adapted to compensate for carrier frequency offset (CFO). Carrier frequency offset is defined as the difference between the expected frequency of the tone being transmitted by a sending node and the actual frequency of the tone. If this offset is constant or nearly constant, the phase of the incoming signal will continue to drift over time. In other words, the I and Q values that are collected by a particular antenna element 37 near the beginning of the CTE 340 may differ from those collected by the same antenna element 37 later in the CTE 340, even if the antennas are all stationary.

The present system and method allow several ways to compensate for this carrier frequency offset. First, referring to FIG. 6, Process 640 may be performed differently than was described above. Specifically, rather than averaging all of the I and Q values associated with a particular antenna element to form a single entry in the I and Q arrays, a different approach is used. In this embodiment, a plurality of I and Q arrays are created. Specifically, as many as N different I and Q arrays may be created where N is the largest whole number that is smaller than or equal to the number of sample slots divided by the number of antenna elements. For example, for the CTE 340 shown in FIG. 3B and an antenna array of 16 antenna elements, there would be 4 I arrays and 4 Q arrays. Thus, the first sixteen sample slots would provide the values for the first set of I and Q arrays, the second sixteen sample slots would provide the values for the second set of I and Q arrays, and so on. Thus, in this embodiment, N is equal to 4.

Each of these I and Q arrays would serve as the input to the CNN 700, as shown in FIG. 7A. As described above, a plurality ($Num_{filt}$) of filters are convolved with each of these I and Q arrays. The filters may be the same for all of the I arrays and may be the same for all of the Q arrays. The convolutions of all of the I arrays with a particular filter may be summed or averaged. In addition, convolutions of all of the Q arrays with a particular filter may be summed or averaged. These two arrays can be added together to form one of the convolution arrays. This process is repeated for all $Num_{filt}$ filters. The remainder of the process is the same as described with respect to FIG. 4.

Figure 7B:
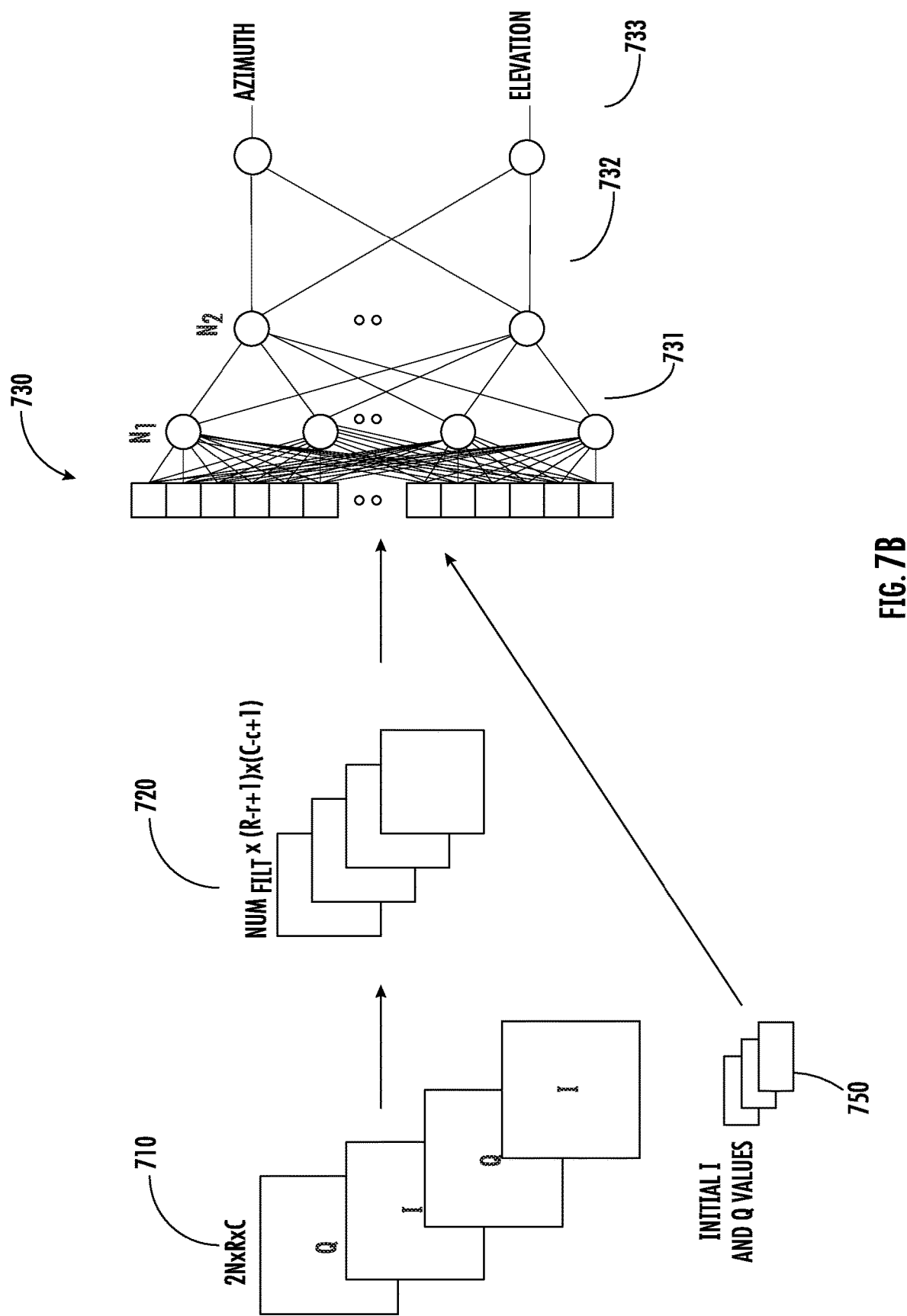

In some embodiments, the processing unit 20 also samples the constant tone extension 340 during at least a portion of the guard period 341 and the reference period 342. The processing unit 20 may collect a plurality of I and Q values that are associated with the guard period 341 and/or the reference period 342. These values may be referred to as initial I and Q values 750. A plurality of these initial I and Q values may be provided to the CNN 700 as additional inputs. This configuration is shown in FIG. 7B.

Thus, in this embodiment, the system and method provides a CNN 700 which is configured to determine an angle of arrival in the azimuth and elevation directions, even in the presence of carrier frequency offset. Further, the present system and method does not use any digital signal processing to compensate for the I and Q values. Rather, the sampled I and Q values from the various antenna elements are input directly into the CNN 700.

Figure 7C:
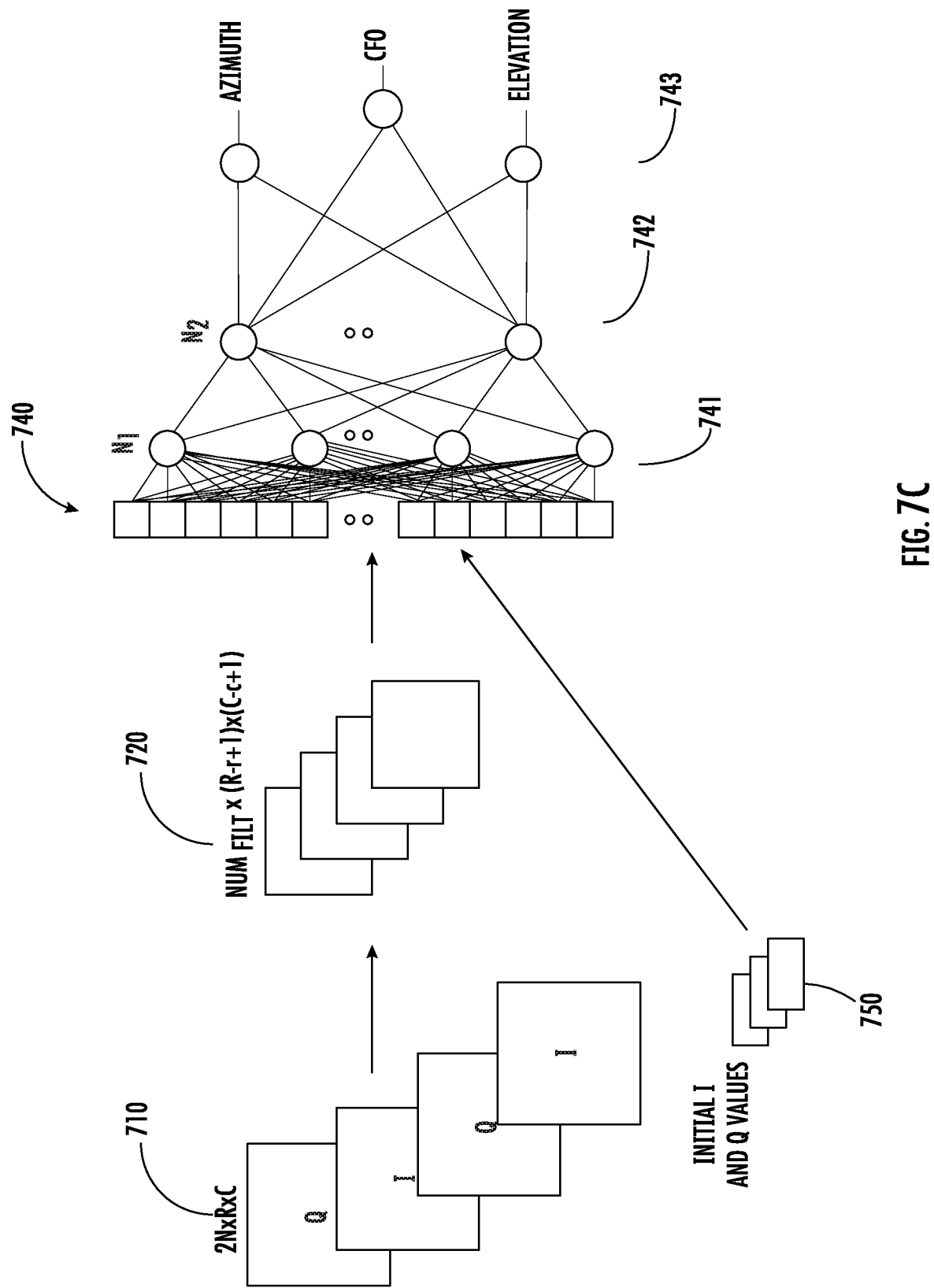

The CNN 700 may also be configured to provide an indication of the carrier frequency offset. FIG. 7C shows such a configuration. Many elements are the same as those shown in FIG. 7B, have been given identical reference designators and are not described again. In this embodiment, the fully connected stage 740 includes a first fully connected layer 741, a second fully connected layer 742 and a final fully connected layer 743. Note that more or fewer fully connected layers may be included in the fully connected stage 740. In addition to an indication of the elevation angle and the azimuth angle, the final fully connected 743 of the fully connected stage 740 also provides an indication of the carrier frequency offset. This indication may be in the form of a number that is representative of the frequency offset in hertz. Although not shown, it is understood that the carrier frequency offset may also be an output of the CNN 700 of FIG. 7A.

Figure 7D:
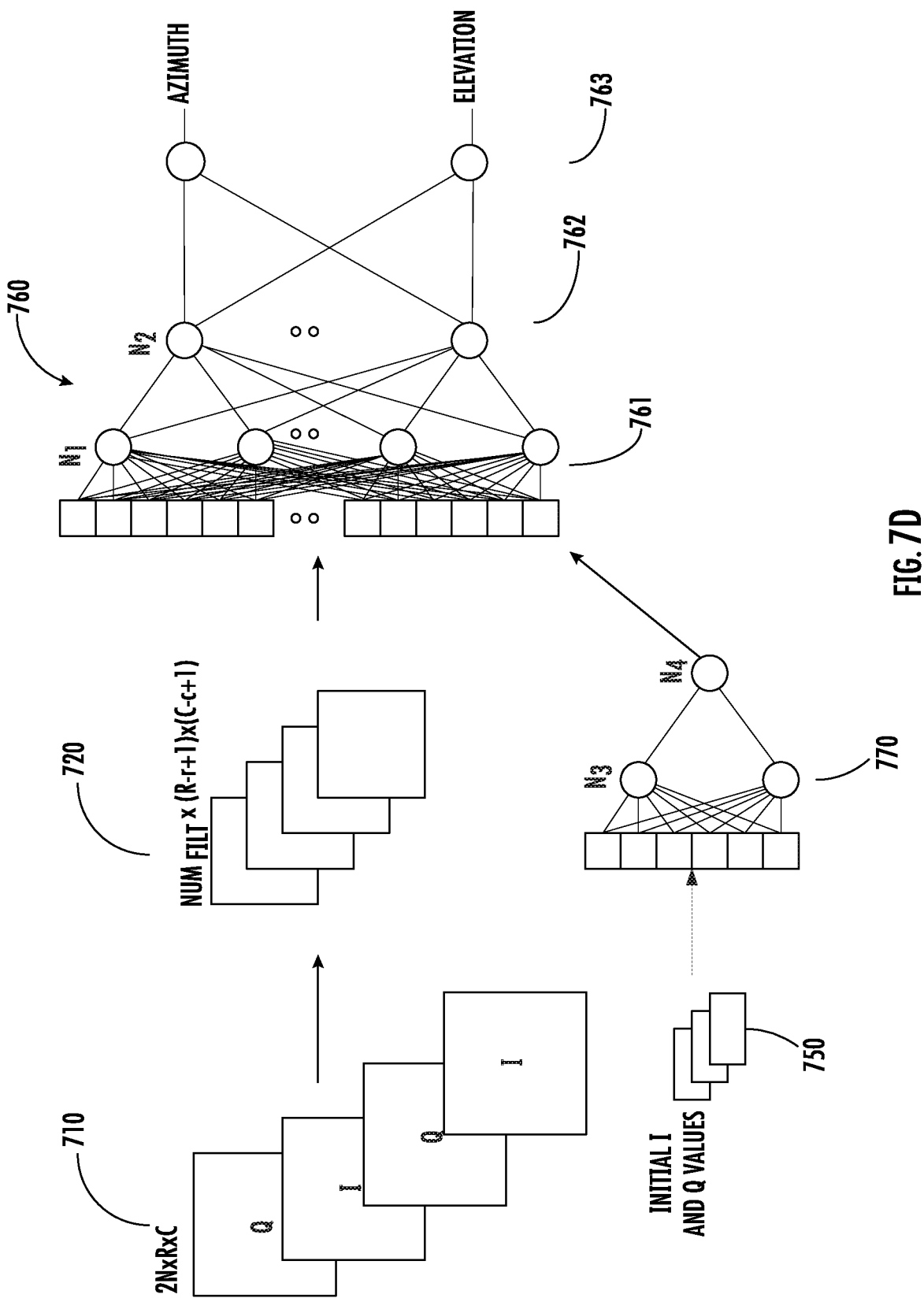

In yet another configuration, the CNN may include a separate stage 770 that is trained to learn the carrier frequency offset using the initial I and Q values 750. This carrier frequency offset is then used as an input to the fully connected stage 760. An example of this configuration is shown in FIG. 7D. The separate stage 770 may be one or more fully connected layers, or may include one or more convolution layers. The output of the separate stage 770 represents an indication of the carrier frequency. This is then used as an input to the fully connected stage 760. Although not shown, it is understood that the carrier frequency offset may also be an output of the CNN of FIG. 7D.

Figure 8:
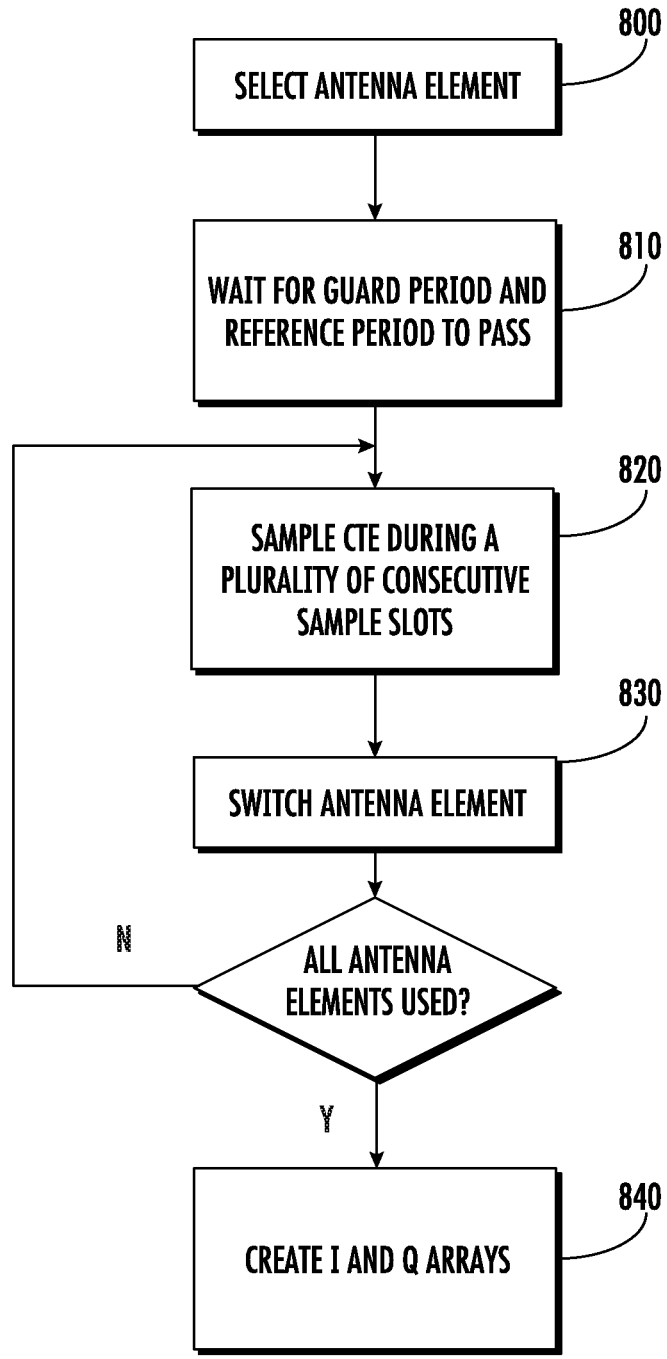
FIG. 8 is a flow chart showing the collection of I and Q samples according to another embodiment.

In another embodiment, the processing unit 20 samples the I and Q signals in a different manner, as shown in FIG. 8. In this flowchart, the samples for a particular antenna element are taken consecutively. This may be done to minimize the probability of a phase wraps. In this embodiment, the CTE 340 would be received using a selected antenna element 37, as shown in Process 800. The processing unit 20 waits until the guard period 341 and the reference period 342 are completed, as shown in Process 810. The initial I and Q values 750, shown in FIGS. 7B-7D are all collected during Process 810.

After the completion of the reference period 342, the switch slots 343 and the sample slots 344 begin. Each antenna element 37 would be used to sample I and Q from a plurality of consecutive sample slots, as shown in Process 820. As an example, assume that there are 16 antenna elements and 74 sample slots. Each antenna element would be used to collect I and Q values from four consecutive sample slots. After the fourth sample slot, the processing unit 20 would switch to the next antenna element, as shown in Process 830. Once all of the antenna elements have been used to sample the incoming tone, the processing unit 20 creates the I and Q arrays, as shown in Process 840. The process then continues as described above with respect to FIGS. 7A-7D, using the I and Q arrays created in Process 840.

The CNN 700 may be trained by applying data from different angles of arrival and varying carrier frequency offsets. Because there are three independent inputs (azimuth angle, elevation angle and carrier frequency offset), it may be possible that more data and a more sophisticated augmentation algorithm are needed to properly train CNN 700.

The angle of arrival or departure may be used for many functions. For example, one angle of arrival locator can be used to locate a beacon. This class of applications may be referred to as wayfinding. For example, the beacon may be a set of car keys or another device that a user needs to find. A user, holding the locator device, may be led to the beacon based on the angle of arrival detected by the locator device. As an example, an automobile may be equipped with Bluetooth. A command may be sent by the owner to the automobile disposed in a parking lot to transmit a beacon or sequence of beacons. The locator device, which is carried by the owner, detects the angle of arrival and can lead the owner toward the automobile in the parking lot. In another embodiments, a shopping mall may install beacons at certain locations, such as near exits, certain stores, or the food court. The shopper may use these beacons to guide their way through the mall using a portable locator device. Similarly, the angle of arrival can be used to guide an operator toward an asset in a warehouse or other structure. The locator device may include an indicator that allows the operator to determine the angle of arrival. For example, the locator device may have a visual display that indicates the direction of the beacon. Alternatively, the locator device may have an audio output that informs the user of the direction of the beacon.

When multiple locators are used, the exact location of the transmitter can be determined. This class of applications is referred to as spatial positioning. For example, inside a structure that has multiple locator devices, the exact location of any transmitter may be determined. This may serve to replace GPS in these environments, as GPS positioning requires more power to execute. In one example, an operator may carry a mobile telephone. A plurality of locator devices each determine the angle of arrival for a beacon transmitted by this phone. In one embodiment, these angles of arrival are forwarded to the mobile phone. In another embodiment, these angles of arrival are forwarded to a centralized computational device, which calculates the position of the mobile phone based on all of the received angles of arrival. Thus, the angle of arrival from each locator device may be used by the mobile phone or another device to pinpoint the specific location of the mobile phone. If a plurality of locator devices are employed, three dimensional spatial positioning may also be possible.

Similar functions can be performed using an angle of departure algorithm. For example, the user may have a device that has a single antenna, rather than an antenna array. If the beacons, such as those described above in the shopping mall or warehouse, utilize an antenna array, the user's device may determine the angle of departure.

The device may also be able to determine the angle of departure from multiple beacons. If the position of the beacons is known, the device may be able to calculate its spatial position from these angles of departure.

In other words, this information can be used in the same manner as angle of arrival information for wayfinding and spatial positioning. Furthermore, the device may have an indicator to provide an indication of the angle of departure to the user. In other embodiments, the device may have an indicator to inform the user of its spatial position.

The present system and method has many advantages. For example, the CNN 400 is able to produce AoX determinations that are at least as accurate as the MUSIC algorithm. However, after being trained, the CNN 400 requires less than 2% of the number of mathematical operations to make this determination. In one test, it was found that MUSIC algorithm required over ten million operations, while the CNN 400 required only 165,000 operations. In systems that are power constrained, such as battery-powered wireless network devices, this represents a great power savings. Furthermore, the CNN can be adapted to determine AoX for non-line-of-sight environments. The CNN 500 not only determines multiple angles, it also determines the relative amplitude of these angles. Finally, the CNN can be adapted to compensate for carrier frequency offset by utilizing a plurality of input I and Q arrays.

Another advantage is that the systems described herein is able to operate using the I and Q samples that are collected during the CTE portion of a packet, without any processing. In other words, there is no need to create pseudospectrums, as is done with other algorithms.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A wireless network device to calculate an angle of arrival or an angle of departure, comprising:
   an antenna array comprising a plurality of antenna elements;
   a wireless network interface, wherein the wireless network interface receives an incoming signal using the antenna array and generates an I signal and a Q signal;
   a processing unit;
   a memory device, comprising instructions, which when executed by the processing unit, enable the wireless network device to:
     receive a packet that includes a constant tone extension (CTE), wherein the CTE comprises a tone having a known frequency and wherein the CTE comprises a guard period, a reference period, a plurality of switch slots and a plurality of sample slots;
     sample the CTE during each of the plurality of sample slots, wherein each antenna element samples at least one sample slot;
     store a plurality of I and Q signals, where one I signal and one Q signal is stored during each sample slot;
     create an I and Q array, wherein dimensions of the I and Q arrays are equal to dimensions of the antenna array, such that a value of an element in the I array is representative of the I signals obtained by a respective antenna element and a value of an element in the Q array is representative of the Q signals obtained by the respective antenna element; and
     use the I and Q arrays as inputs to a neural network, wherein the neural network produces outputs indicative of the angle of arrival of the incoming packet.

2. The wireless network device of claim 1, wherein the outputs comprise an azimuth angle and an elevation angle.

3. The wireless network device of claim 1, wherein the outputs comprise a first complex number where an arc tangent of the first complex number is an azimuth angle and a second complex number where an arc tangent of the second complex number is an elevation angle.

4. The wireless network device of claim 1, wherein the neural network comprises a convolutional neural network.

5. The wireless network device of claim 4, wherein the convolutional neural network comprises a convolutional stage and a fully connected stage, wherein the convolutional stage comprises one or more convolutional layers and the fully connected stage comprises one or more fully connected layers.

6. The wireless network device of claim 1, wherein each antenna element samples at least two sample slots and the value of an element in the I array is an average of the I signals obtained by a respective antenna element and a value of an element in the Q array is an average of the Q signals obtained by the respective antenna element.

7. A wireless network device to calculate an angle of arrival or an angle of departure, comprising:
an antenna array comprising a plurality of antenna elements;
a wireless network interface, wherein the wireless network interface receives an incoming signal using the antenna array and generates an I signal and a Q signal;
a processing unit;
a memory device, comprising instructions, which when executed by the processing unit, enable the wireless network device to:
receive a packet that includes a constant tone extension (CTE), wherein the CTE comprises a tone having a known frequency and wherein the CTE comprises a guard period, a reference period, a plurality of switch slots and a plurality of sample slots;
sample the CTE during each of the plurality of sample slots, wherein each antenna element samples at least one sample slot;
store a plurality of I and Q signals, where one I signal and one Q signal is stored during each sample slot;
create an I and Q array, wherein dimensions of the I and Q arrays are equal to dimensions of the antenna array, such that a value of an element in the I array is representative of the I signals obtained by a respective antenna element and a value of an element in the Q array is representative of the Q signals obtained by the respective antenna element; and
use the I and Q arrays as inputs to a neural network, wherein the neural network determines a plurality of angles of arrival and wherein for each angle of arrival, the neural network produces a first output representative of an azimuth angle, a second output representative of an elevation angle and a third output representative of an amplitude.

8. The wireless network device of claim 7, wherein the third output associated with the strongest signal is set to one and the other third outputs are normalized to this output.

9. The wireless network device of claim 7, wherein the first output comprises the azimuth angle and the second output comprises the elevation angle.

10. The wireless network device of claim 7, wherein the first output comprises a first complex number where an arc tangent of the first complex number is the azimuth angle and the second output comprises a second complex number where an arc tangent of the second complex number is the elevation angle.

11. The wireless network device of claim 7, wherein the neural network comprises a convolutional neural network.

12. The wireless network device of claim 11, wherein the convolutional neural network comprises a convolutional stage and a fully connected stage, wherein the convolutional stage comprises one or more convolutional layers and the fully connected stage comprises one or more fully connected layers.

13. The wireless network device of claim 7, wherein each antenna element samples at least two sample slots and the value of an element in the I array is an average of the I signals obtained by a respective antenna element and a value of an element in the Q array is an average of the Q signals obtained by the respective antenna element.

14. A wireless network device to calculate an angle of arrival or an angle of departure, comprising:
an antenna array comprising a plurality of antenna elements;
a wireless network interface, wherein the wireless network interface receives an incoming signal using the antenna array and generates an I signal and a Q signal;
a processing unit;
a memory device, comprising instructions, which when executed by the processing unit, enable the wireless network device to:
receive a packet that includes a constant tone extension (CTE), wherein the CTE comprises a tone having a known frequency and wherein the CTE comprises a guard period, a reference period, a plurality of switch slots and a plurality of sample slots;
sample the CTE during each of the plurality of sample slots, wherein each antenna element samples at least N sample slots;
store a plurality of I and Q signals, where one I signal and one Q signal is stored during each sample slot;
create N different I and Q arrays, wherein dimensions of each I and Q arrays are equal to dimensions of the antenna array, such that a value of an element in the I array is the I signal obtained by a respective antenna element during one sample slot and a value of an element in the Q array is the Q signal obtained by the respective antenna element during the one sample slot; and
use the N different I and Q arrays as inputs to a neural network, wherein the neural network produces outputs indicative of the angle of arrival of the incoming packet.

15. The wireless network device of claim 14, wherein the use of N different I and Q arrays compensates for carrier frequency offset.

16. The wireless network device of claim 14, wherein the processing unit samples the CTE during at least a portion of the guard period and the reference period and creates initial I and Q values based on samples from the guard period and the reference period, and wherein the initial I and Q values are inputs to the neural network.

17. The wireless network device of claim 16, wherein the neural network comprises a convolution stage and a fully connected stage, and wherein the initial I and Q values are inputs to the fully connected stage.

18. The wireless network device of claim 16, wherein the neural network comprises a convolution stage, a fully connected stage, and a separate stage, wherein the initial I and Q values are inputs to the separate stage which provides an indication of carrier frequency offset to the fully connected stage.

19. The wireless network device of claim 16, wherein the neural network produces an output indicative carrier frequency offset.

20. The wireless network device of claim 14, wherein the neural network comprises a convolutional neural network.

* * * * *